June 30, 1970  P. R. EKLUND  3,517,974
METHOD OF HEAT TREATING TO PRODUCE A WEAR-RESISTANT
AND LOW FRICTION SURFACE
Filed Nov. 6, 1968
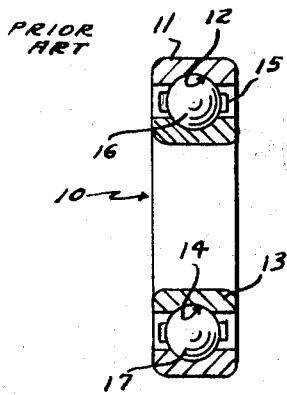
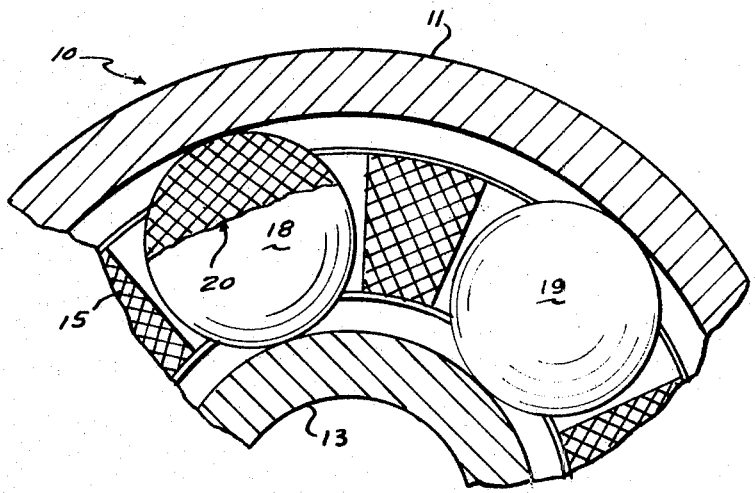
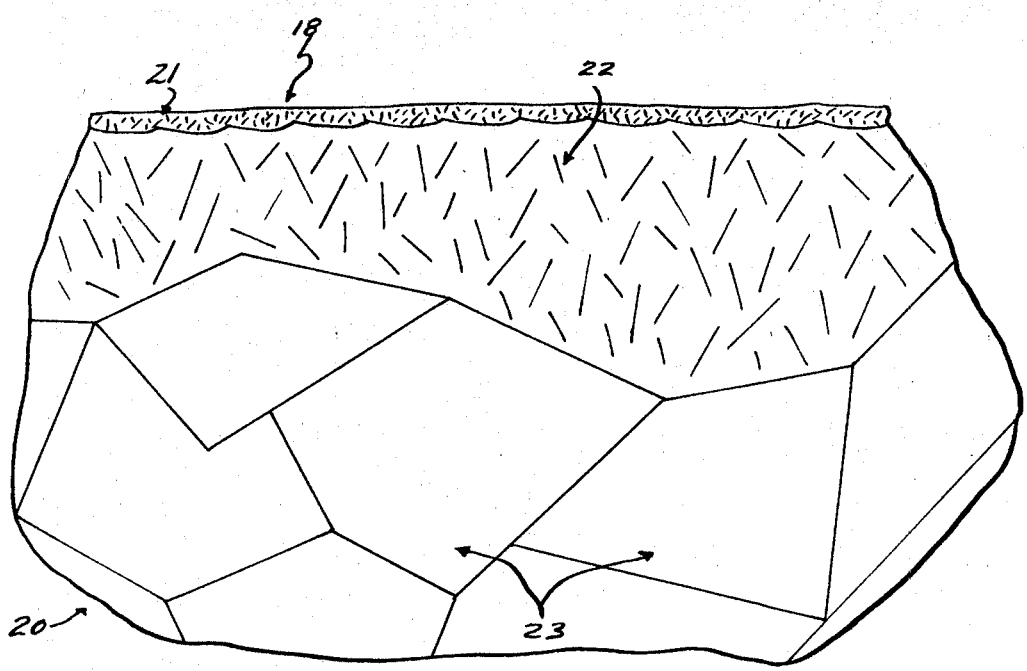
INVENTOR.
PHILLIP R. EKLUND
BY Harry A. Herbert Jr.
ATTORNEY
Arthur R. Parker
AGENT United States Patent Office 3,517,974
Patented June 30, 1970

3,517,974
METHOD OF HEAT TREATING TO PRODUCE A WEAR-RESISTANT AND LOW FRICTION SURFACE
Phillip R. Eklund, Dayton, Ohio, assignor to the United States of America as represented by the Secretary of the Air Force
Filed Nov. 6, 1968, Ser. No. 773,836
Int. Cl. F16c 1/24; B21d 53/12
U.S. Cl. 308—187                                             9 Claims

ABSTRACT OF THE DISCLOSURE

A self-lubricating surface structure of low wear and friction characteristics resulting from subjecting bearing rolling contact and/or other rolling or sliding contact elements to a fluoridizing atmosphere of dissociated nitrogen tetrafluoride gas. A unique complex of nitrides, carbonitrides, and fluorides is formed in, and the surface structure is further impregnated with a series of nitride needles to produce a high load, low friction and increased wear capability therein.

BACKGROUND OF THE INVENTION

This invention relates generally to the field of ball and/or roller bearings and, more specifically, to the heat treatment of the surface structure of bearing members through the exposure thereof to a particular gas atmosphere under a predetermined temperature to thereby produce a relatively low wear and friction surface structure.

In the use of gas bearings, for example, for high speed cryogenic turbo machinery, where initial surface contact at high speeds can cause bearing failure due to galling; or where ball or roller bearings are applied in miniature cryogenic compressors; or in any application where loss of conventional lubricants may result in a catastrophe, the use of some self-lubricating means or, in other words, an unlubricated-type of bearing structure is essential. Previous efforts in this area have included the use of "dry films" wherein a powdered material, such as graphite or molydenum disulfide, is mixed with a carrier-type vehicle and then applied ot the surface to be treated thereby. Thereafter, this mixture is baked until the said carrier-type vehicle is evaporated to thereby leave a dry film coating on the surface.

Although such a dry film-type coating, which is usually on the order of 0.001 to 0.002 inch in thickness, actually accomplishes some degree of lubrication, it is normally easily worn-off in service and, therefore, the wear life capability of the bearing member treated thereby is usually of a relatively short duration. Moreover, no means are ordinarily provided for its renewal. However, it has been observed during the testing of ball and roller bearings for use under unlubricated conditions that, with the use of a "Teflon" composition retainer element and during the careful running of certain equipment for a break-in period of several hours, a mono-molecular-type of film is continually transferred from the retainer element to the various rolling contact surfaces of the bearing assembly. Afterwards, these rolling bearing contact surfaces proved to be operable for an extended period without any incipient failure or malfunction thereof, and without any fluid-type lubricant being used.

Further improvements in the area of the non-lubricated type of bearing structures involved during the present development, includes the spray coating of the rolling contact elements with an FEP type of fluorocarbon spray, followed by air-drying the spray on the bearing element surface structure for about one-half hour, and thereafter baking the sprayed and air-dried film for approximately one to two hours at a temperature of about 650° F. The latter procedure, which forms the subject matter of my co-pending patent application, entitled "Unlubricated Ball and Roller Bearings," forms a thin, transparent film or coating on the surface structure of the bearing element being treated thereby. This thin film has enabled such bearing components to be immediately loaded and started at full speed without either any break-in period being required, or the use of any separate fluid lubricant. Considerable tests in current progress has also revealed that the foregoing type of unlubricated bearing element substantially eliminates the spalling-type of failure usually occurring in other types of bearings. Moreover, little or no wear has resulted in the thin, transparent coating formed and the latter has further exhibited a relatively low friction characteristic. Finally, when this previously-developed, improved technique of depositing a thin film coating by spraying the surface to be treated with a fluorocarbon-type composition was combined with the use of the previously-noted Teflon composition retainer element even further wearability was imparted to the bearing component being treated thereby. In this regard, the present invention consists of a unique heat treatment that provides an alternative technique for treating the normally untreated surfaces of bearings and other rolling and/or sliding contact elements and which is likewise an improvement over previously-developed methods, such as the aforementioned "dry film" technique, as will become readily apparent from the following summary and detailed description thereof.

SUMMARY OF THE INVENTION

The present invention briefly consists of an improved method for post heat-treating the surface structure of rolling bearing contact, or other rolling or sliding contact elements with a fluoridizing atmosphere such as dissociated nitrogen tetrafluoride. This gas combines with, and forms a surface structure generally comprising a complex of metallic fluorides. Furthermore, the surface structure so formed consists of a fluoride complex comprising of what has the appearance of a thin, superficial "case-type" of structure approximately 1 mil in thickness and incorporationg nitride needles dispersed or impregnated throughout the said structure. With the formation of the aforesaid metallic fluorides and, in particular, with the said nitride needles being dispersed throughout the surface structure of the bearing component, there results an improved surface structure of novel configuration that is both fine, dense, hard and tough and which further exhibits a high resistance both to deformation and wear and, at the same time, offers decreased resistance to friction.

Other features, objects and advantages of the invention will appear from the following disclosure thereof, in which:

BRIEF DESCRIPTION OF THE DRAWING

FIG. 1 represents a broken-away and partially schematic sectional view of one type of ball-bearing arrangement in which the heat treatment method of the present invention may be incorporated;

FIG. 2 is a second broken-away, transverse sectional and relatively enlarged view, illustrating additional details of the inventive arrangement including the composite-type of retainer element utilizable therewith, and further showing one of the ball bearing elements incorporated therein in partly cut-away condition to thereby schematically depict the improved ball bearing element-surface structure formed by the heat treating method of the present invention; and FIG. 3 is still another schematic view, partly broken-away and diagrammatic in form, illustrating in greatly magnified condition a minute cross section of the improved ball bearing arrangement surface structure, generally depicted in the cut-away view of FIG. 2, and further illustrated after the novel heat treatment of the present invention has been applied thereto.

DESCRIPTION OF THE PREFERRED EMBODIMENT

Referring generally to the drawing and, in particular, to FIG. 1 thereof, a portion of a type of ball bearing assembly that is well known in the art and to which the present invention may be applied is illustrated generally at 10 as including, in part, an outer ring 11 that incorporates the outer ring ball race 12; an inner ring 13 that incorporates the inner ring ball race 14, and the retainer element shown schematically at 15. Said ball bearing assembly 10 may be used with the motor-drive shaft, for example, of a miniature-type of cryogenic refrigerating machinery, or cryogenerator compressor unit of the type set forth in my copending patent application, entitled "Cryogenic Refrigerator Compressor Improvement." Of course, a series of ball bearing elements, two of which are shown at 16 and 17, respectively, are held in their position in bearing relation between the aforesaid outer and inner rings 11 and 13 by means of the previously-noted retainer element 15.

In FIGS. 2 and 3, both of which may represent enlarged sectional views of a portion of the roller bearing assembly 10 of FIG. 1, two of the intermediately positioned ball bearing elements of the series are depicted at the reference numerals 18 and 19, respectively, as being mounted in one section of the overall bearing assembly. Again, ball bearing elements 18, 19 are retained in their proper bearing relation between the outer and inner rings 11, 13 by means of the aforementioned retainer element 15. In addition, the ball bearing element 18, which is representative of the entire series of such elements, is illustrated with a cut-away section indicated generally at 20. The said cut-away section 20 is indicated in more detail in the view of FIG. 3, which represents a cross-section of the improved surface microstructure that may be formed in each ball bearing element, such as at 18, by the novel heat treatment method of the present invention. This heat treatment technique may be applied either to the ball bearing elements, such as is indicated at 16 and 17 in FIG. 1 and at 18 and 19 in FIG. 2, and/or to the inner and outer bearing races at 12 and 14 (FIG. 1), or to any other type rolling or sliding contact elements such as roller bearings, or gear teeth.

The aforementioned heat treatment method of the present invention is applied, after the ball, roller or other bearing contact element, which may preferably consist of a ferrous alloy material, has itself been heat treated and tempered at a temperature of approximately 1000° F., and machined finished. The basic ferrous alloy ball bearing, or other rolling and/or sliding contact element to be treated by the present method is initially heat treated and tempered at about the aforesaid 1000° F. temperature so that its initial degree of hardness will remain substantially unaffected during the subsequent exposure thereof to the latter heat treatment method of the present invention. In this regard, it has been observed that when operating the bearing at room temperatures the localized surface temperatures thereof, or what is called the "molecular flash temperatures," can reach values of approximately 800° F., even though the temperature measured by the thermocouple means may be indicated as only 90° F. to 95° F. at the outer race. Thus, it is apparent that ferrous alloy bearing elements must obviously have adequate resistance to softening at the aforesaid rather elevated temperatures. For this purpose, there is actually a number of already-available alloy tool steels, high speed steels, and/or stainless steels from which the ferrous alloy bearing, or other rolling and/or sliding contact element involved with the present invention may be selected.

After selection of the desired steel alloy material, the latter may then be first rough machined, heat treated and tempered, and thereafter machine finished to the precise dimensions desired for the particular application.

After having been prepared as outlined hereinbefore, the surface structure of the bearing or other component to be treated may thereafter be further prepared by the new and novel heat treatment of the present invention. Thus, for example, the ball bearing elements previously-indicated at 18 and 19 in FIG. 2 may be exposed, in accordance with the unique improvement taught by the present invention, to an atmosphere of dissociated fluoride gas, such as nitrogen tetrafluoride, or a similar gas. This exposure is made at a temperature of approximately 900 to 1000° F. for an extended period of time, which in a particular application, may vary from two to ten hours. As a suitable alternative, the bearing component to be treated may be exposed to the action of the said nitrogen tetrafluoride gas after the latter has been bubbled up through a salt bath solution at the same approximately 1000° F. temperature. This exposure to the combined action of the nitrogen tetrafluoride gas and the salt bath may require a period of one-half to one and one-half hours.

During the exposure of the rolling and/or sliding contact element, such as the ball bearing elements 18 and 19, to either the nitrogen tetrafluoride gas alone, or in combination with the salt bath, the elements of the said gas combines with the various alloy constituents in the surface structure to thereby form a complex of fluorides throughout the said structure. This fluoride complex may constitute a thin superficial "case-type" of structure not exceeding 0.001 inch in thickness or depth. When this is supported by the relatively hard and tough substructure of the basic ferrous alloy material comprising the ball bearing element 18, for example, and which may further have a hardness of 64–66 $R_c$, a marked improvement in the wear resistance capability thereof, coupled with a low friction resistance, has been noted in the said surface structure. Thus, as seen particularly in FIG. 3, which represents the surface structure magnified one-thousand times, when the bearing element 18, for instance, is subjected to the present heat treatment and exposure to one of the alternative nitrogen tetrafluoride gas forms, previously explained, a unique microstructure, as indicated generally at the reference numeral 20, is formed in the surface structure thereof. The microstructure 20 includes the formation of the previously-described complex of metallic fluorides, indicated generally at 21, and a uniquely-formed series of nitride needles, which are indicated generally at 22 as being dispersed, or impregnated throughout the entire surface structure. The overall microstructure 20 is shown supported on, and to the ferrous alloy substructure of the bearing element, as at 18, being treated by the present process. Some of the basic metal grains of the said substructure are depicted in greatly magnified (1000×) form at the reference numeral 23.

Although the surface complex 21 is depicted in the aforementioned FIG. 3 as apparently being oriented in the surface structure 20 only in the section thereof nearest the outermost surface thereof, it is to be understood that the said complex, consisting basically of the aforementioned metallic fluorides, is actually dispersed throughout the said surface structure. Thus, it is depicted in diagrammatic form in FIG. 3 in order to permit a clearer showing of the previously-noted, nitride needles 22. The latter elements, which again can only be depicted in diagrammatic, or schematic form, provide a further and unique improvement during the novel nitro-fluoridizing process of the present invention. In this connection, the present heat treatment not only provides the development of various alloy carbides, as is the case in the normal heat treating of the alloy steels previously-noted as being already available, it forms with the dissociated nitrogen tetrafluoride gas the aforementioned complex of metallic fluorides, which per se uniquely provide a surface structure of improved wear life capability, and, perhaps more importantly, the present nitro-fluoridizing process results in the impregnation or dispersion of various nitride needles, as at 22, throughout the surface structure 20.

Since the formation of such nitride needles 22 are submicroscopic in nature, a judicious dispersion of a multiple of alloy nitrides throughout the surface structure 20 offers substantial reinforcement of the bearing surface against the tangential shear stresses, or surface creep at the contacting surfaces of the rolling and/or sliding contact elements utilizing the present treatment. Moreover, the previously-mentioned supporting core, or substructure comprising the metal grains 23 (FIG. 3), which may have a hardness of 64 $R_c$, will offer a high resistance to yielding or deformation under the action of concentrated loading, such as that occurring at the contacting surfaces of the ball bearing-outer and inner races 12 and 14 (note FIG. 1). Again, although a "case-type" structure configuration is formed in the microstructure 20, as illustrated in FIG. 3, with the employment of the improved technique of the present invention, the said "case" is not well-defined at the outer surface, as in other methods, but is dispersed throughout and, as such, prevents the spalling phenomenon usually occurring in the more conventional "case-type" of structures. Moreover, such a thin "case" type structure as is formed in the present invention is also considered less susceptible to the phenomenon called "microcracking" because it has greater flexibility under localized yielding.

Thus, a new and improved method and technique of forming a bearing rolling contact and/or other rolling and sliding contact elements with an improved, more wear-resistant and yet low frictional resistance surface structure has been developed by the present invention. Moreover, the present method also offers the advantages of eliminating the formation of hydrogen gas pockets inherent in conventional nitriding methods where the parts to be treated are exposed to an atmosphere of dissociated ammonia, for example. The hydrogen present in the latter treatment diffuses into and is held in the core, or substructure, by the nitrided case. It thereby becomes entrapped beneath the said case and, as a result of attempting to diffuse outwardly during service, forms blisters and microcracks which lead to surface deterioration and spalling. On the other hand, the nitro-fluoridizing process of the instant invention uses no hydrogen and, therefore, there is no danger from entrapped hydrogen. In fact, any otherwise entrapped gas should pass outwardly through the improved superficial surface structure of the present process.

Although a preferred embodiment of the invention has been shown and described for purposes of exemplification, it is apparent that many modifications and changes may be made without departing from the true spirit or scope of the invention, as defined hereinafter in the accompanying claims.

I claim:

1. In a method of producing a substantially frictionless, relatively long wear-resistant and self-lubricating surface structure on rolling bearing, or other rolling and/or sliding contact components, the steps comprising; selecting a component from a steel alloy utilizable as a substructure, or core member and which has been initially machine finished to the desired configuration and thereafter heat treated and tempered to a predetermined and relatively high degree of hardness; and subsequently pretreating said component to thereby form the said self-lubricating surface structure by exposing the contacting surfaces thereof to a nitro-fluoridizing composition at a relatively high temperature approaching that at which the substructure or core member is initially hardened but not significantly reducing the hardness thereof; said nitro-fluoridizing composition thereby combining with the alloy constitutents of the steel substructure or core member to thereby transform the surface structure into a relatively thin case-type configuration principally comprised of a combination of metallic fluorides dispersed throughout, and imparting increased wearability and ruggedness to the said surface structure, and further forming and being impregnated with nitride needles additionally reinforcing the surface structure of said rolling and/or sliding contact elements and thereby increasing the inherent resistance thereof to tangential shear stresses normally occurring at the component contacting surfaces during the operation thereof.

2. In a method of producing a substantially frictionless, relatively long wear-resistant and self-lubricating surface structure as in claim 1, wherein the steps of producing a relatively long wear-resistant, self-lubricating surface may further include the additional step of combining a film-coating supply means positioned in operative relation to, and in rolling or sliding contact with, each of said rolling or sliding contact components to thereby ensure the transnfer of a coating of substantially frictionless material to the outermost surface of said structure for a continuous period throughout the operation thereof to thereby even further prolong its wear life capability.

3. In a method of producing a substantially frictionless, relatively long wear-resistant and self-lubricating surface structure as in claim 2, wherein the said film-coating supply means for continuously transferring a coating of substantially frictionless material to the surface structure may comprise a Teflon composition rolling or sliding contact component-retainer element.

4. In a method of producing a substantially frictionless, relatively long wear-resistant and self-lubricating surface structure as in claim 1, wherein the nitro-fluoridizing composition used in the step for pretreating the contacting surfaces of each of said rolling or sliding contact components may comprise nitrogen tetrafluoride gas.

5. In a method of producing a substantially frictionless, relatively long wear-resistant and self-lubricating surface structure as in claim 1, wherein the nitro-fluoridizing composition applied in the said rolling or sliding contact component-pretreating step may further comprise the additional steps of initially bubbling or filtering nitrogen tetrafluoride gas through a salt bath and thereafter exposing the surface structure to be treated thereby to the combined effect of said nitrogen tetrafluoride gas and salt bath.

6. In a cryogenic, or noncryogenic-type of rolling and/or sliding contact-component assembly; at least one substantially frictionless, long wearing and self-lubricating member having a base or substructure portion initially heat treated and tempered to a relatively high degree of hardness; first means for pretreating said base or substructure at a relatively high temperature to thereby form the surface structure thereof into a substantially frictionless, long wearing and self-lubricating configuration; said first means comprising a nitro-fluoridizing compositon initially in the gaseous state and exposing the contacting surfaces of said base or substructure thereto at a relatively high temperature, and subsequently combining with the constituents, and transforming the surface structure of said base of substructure into a combined complex of metallic fluoride and nitride needles dispersed throughout said surface structure, and thereby forming the latter into a longer wearing, more rugged and substantially frictionless condition; and second means in operable-contacting engagement with said member for supplying substantially frictionless material in coating form to the outer surface thereof and thereby promote additional wear life thereto.

7. In a cryogenic, or noncryogenic-type of rolling and/or sliding contact-component assembly as in claim 6, wherein said first-named means comprises a nitrogen tetrafluoride gas composition.

8. In a cryogenic, or noncryogenic-type of rolling and/or sliding contact-component assembly as in claim 6, wherein said first-named means may comprise a nitrogen tetrafluoride gas composition in combination with a salt bath, said substantially frictionless, long wearing and self-lubricating member being exposed to the combined action of said nitrogen tetrafluoride gas subsequently to the latter having been filtered through said salt bath to thereby produce a surface structure of considerably increased wear life, resistance to the normal effects of spalling and galling, and exhibiting a substantially frictionless characteristic negating any need for a fluid-type lubricant.

9. In a cryogenic, or noncryogenic-type of rolling and/or sliding contact-component assembly as in claim 6, wherein said second means may comprise a Teflon composition retainer element positioned in contacting and supporting relation to the surface structure of said base or substructure portion.

References Cited

UNITED STATES PATENTS 3,198,735   8/1965   Lamson et al. _____ 308—241

MARTIN P. SCHWADRON, Primary Examiner

F. SUSKO, Assistant Examiner

U.S. Cl. X.R.

29—148.4; 308—241